(12) United States Patent
Kato et al.

(10) Patent No.: US 7,786,178 B2
(45) Date of Patent: *Aug. 31, 2010

(54) PROCESS FOR PRODUCING FINE SILVER PARTICLE COLLOIDAL DISPERSION, FINE SILVER PARTICLE COLLOIDAL DISPERSION, AND CONDUCTIVE SILVER FILM

(75) Inventors: Kenji Kato, Chiba (JP); Masaya Yukinobu, Chiba (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 1181 days.

This patent is subject to a terminal disclaimer.

(21) Appl. No.: 10/553,240

(22) PCT Filed: Apr. 27, 2004

(86) PCT No.: PCT/JP2004/006053

§ 371 (c)(1),
(2), (4) Date: Oct. 14, 2005

(87) PCT Pub. No.: WO2004/096470

PCT Pub. Date: Nov. 11, 2004

(65) Prior Publication Data

US 2006/0264518 A1    Nov. 23, 2006

(30) Foreign Application Priority Data

Apr. 28, 2003    (JP) .................... 2003-123063

(51) Int. Cl.
*B01F 3/12*    (2006.01)
*B22F 9/24*    (2006.01)
*H01B 1/22*    (2006.01)
*H01B 13/00*    (2006.01)

(52) U.S. Cl. .............. 516/97; 252/514; 252/520.3; 977/773; 977/777; 106/1.23

(58) Field of Classification Search .......... 516/97; 252/514, 520.3; 977/773, 777; 423/28
See application file for complete search history.

(56) References Cited

U.S. PATENT DOCUMENTS 6,447,909 B1 *  9/2002  Kato et al. ............... 428/403
6,451,433 B1     9/2002  Oka et al.

FOREIGN PATENT DOCUMENTS

| EP | 1 020 890 A1 | 7/2000 |
|---|---|---|
| EP | 1 195 773 A1 | 4/2002 |
| JP | 4-321628 | 11/1992 |
| JP | 10-330654 | 12/1998 |
| JP | 11-329071 | 11/1999 |
| JP | 2000-87122 | 3/2000 |
| JP | 2000-87122 A * | 3/2000 |
| JP | 2000-268639 | 9/2000 |
| JP | 2001-93414 | 4/2001 |
| JP | 2002-334618 | 11/2002 |
| JP | 2003-103158 | 4/2003 |
| JP | 2003-193119 | 7/2003 |
| WO | 01/57885 A1 | 8/2001 |

OTHER PUBLICATIONS

Machine English translation of JP 2000-87122 A, obtained online @ http://www19.ipdl.inpit.go.jp/PA1/cgi-bin/PA1INDEX , JPO, Tokyo, Japan, downloaded Aug. 2008, pp. 1-15.*
Search Report and Written Oppinion for PCT/JP2004/006053, ISA/JP at JPO, Tokyo, Japan, (Aug. 2004), pp. 1-14.*

* cited by examiner

*Primary Examiner*—Daniel S Metzmaier
(74) *Attorney, Agent, or Firm*—Kratz, Quintos & Hanson, LLP

(57) ABSTRACT

A process for producing a fine silver particle colloidal dispersion which can simply form conductive silver layers and antimicrobial coatings by screen printing or the like. The process is characterized by having a reaction step of allowing an aqueous silver nitrate solution to react with a mixed solution of an aqueous iron(II) sulfate solution and an aqueous sodium citrate solution to form an agglomerate of fine silver particles, a filtration step of filtering the resultant agglomerate of fine silver particles to obtain a cake of the agglomerate of fine silver particles, a dispersion step of adding pure water to the cake to obtain a first fine silver particle colloidal dispersion of a water system in which dispersion the fine silver particles have been dispersed in the pure water, and a concentration and washing step of concentrating and washing the first fine silver particle colloidal dispersion of a water system.

3 Claims, 1 Drawing Sheet

Figure
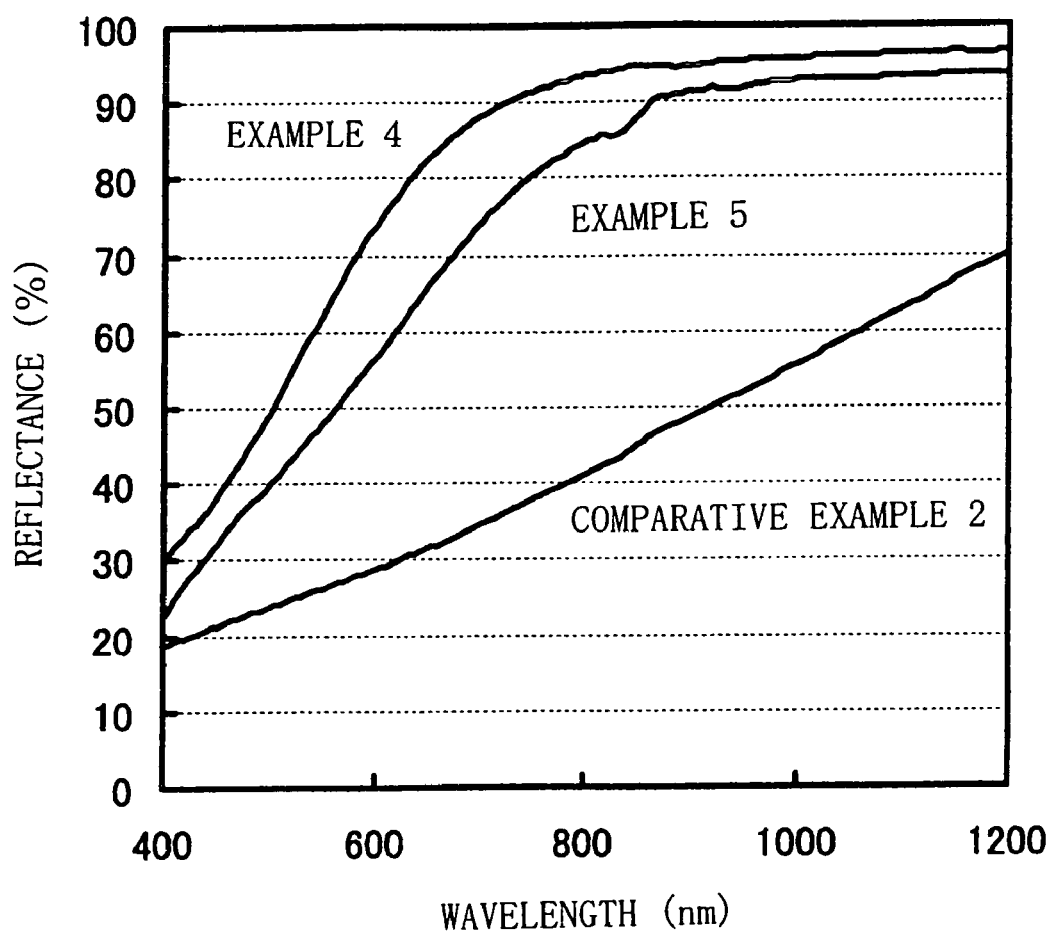

PROCESS FOR PRODUCING FINE SILVER PARTICLE COLLOIDAL DISPERSION, FINE SILVER PARTICLE COLLOIDAL DISPERSION, AND CONDUCTIVE SILVER FILM

TECHNICAL FIELD

This invention relates to a fine silver particle colloidal dispersion used to simply form conductive silver layers or antimicrobial coatings by a printing method such as screen printing or ink-jet printing; the layers or coatings being formed on substrates. More particularly, this invention relates a process for producing a fine silver particle colloidal dispersion containing no polymeric dispersing agent, a fine silver particle colloidal dispersion obtained by this process, and a conductive silver film formed using this fine silver particle colloidal dispersion.

BACKGROUND ART

Conventional fine silver particle colloidal dispersions are those in which fine particles of a noble metal such as silver have been dispersed in a solvent in a low concentration of 10% by weight at most, and are used as a transparent conductive layer forming coating fluid used to prevent electromagnetic waves from leaking in computer displays or the like (see Japanese Patent Applications Laid-open No. H11-329071 and No. 2000-268639), a coating fluid for forming antimicrobial coatings (see Japanese Patent Application Laid-open No. H4-321628), and so forth.

For example, in the use for preventing electromagnetic waves from leaking in computer displays or the like, a front glass panel of a cathode ray tube (CRT) is coated with the transparent conductive layer forming coating fluid by spin coating or the like, followed by drying and thereafter baking at a temperature of about 200° C. to form a transparent conductive layer.

Recently, however, in order to form conductive silver layers or the like more simply according to uses, a method is also proposed in which a fine silver particle colloidal dispersion paste in which fine silver particles have been dispersed in a high concentration is used to carry out printing by a printing method such as screen printing, followed by baking at a temperature of about 200° C. (see Japanese Patent Application Laid-open No. 2000-334618).

However, the fine silver particle colloidal dispersion paste used for such a purpose has ever been produced by an evaporation-in-gas method in which silver is evaporated and condensed in a gas under reduced pressure to collect the silver in a solution containing a polymeric dispersing agent. Hence, this method affords a very poor productivity, and therefore the fine silver particle colloidal dispersion paste thus obtained has been very expensive. Moreover, in this fine silver particle colloidal dispersion paste, a polymeric dispersing agent or the like capable of combining strongly with the surfaces of fine silver particles is contained in order to improve dispersion stability, and hence it is necessary to decompose and remove it by high-temperature heat treatment after printing and drying. This can not be said to be preferable.

A method is also proposed in which fine silver particles are formed by wet-process reaction to produce a fine silver particle colloidal dispersion in which the fine silver particles have been dispersed in a high concentration (see Japanese Patent Application Laid-open No. 2003-103158). This method, however, makes use of a polymeric dispersing agent capable of combining strongly with the surfaces of fine silver particles, in order to improve the stability of dispersion of the fine silver particles formed at the time of the reaction. Accordingly, where a conductive silver film is formed using this fine silver particle colloidal dispersion in which the fine silver particles have been dispersed in a high concentration, there has been a problem that the conductive silver film to be formed can not easily be made to have a low resistivity if heat-treated at a low temperature.

In addition, in respect of fine silver particle colloidal dispersions such as the fine silver particle colloidal dispersion paste, the viscosity of fine silver particle colloidal dispersions is required to be freely controllable, in order to make them adaptable to various printing or coating methods such as screen printing, gravure printing and ink-jet printing. Such viscosity is commonly controlled by adding a viscosity modifying component such as a binder resin to a system. However, like the above polymeric dispersing agent, the viscosity modifying component added is required to be heat-treated at a high temperature, and such a requirement has caused a problem that the conductive silver film formed has a poor conductivity.

DISCLOSURE OF THE INVENTION

The present invention has been made taking account of such circumstances in conventional cases. Accordingly, an object of the present invention is to provide a process for producing a fine silver particle colloidal dispersion of a water system, a water-organic solvent system or an organic solvent system; the process being simple and being superior in productivity compared with conventional processes for producing fine silver particle colloidal dispersions such as the fine silver particle colloidal dispersion paste.

Another object of the present invention is to provide inexpensive fine silver particle colloidal dispersions of a water system, a water-organic solvent system and an organic solvent system which dispersions have a superior dispersion stability, are adaptable to various printing or coating methods, and moreover can form highly conductive films even when heat-treated at a low temperature after printing or coating, and at the same time provide conductive silver films formed using these fine silver particle colloidal dispersions.

That is, the process for producing a fine silver particle colloidal dispersion of a water system according to the present invention is characterized by having:

a reaction step of allowing an aqueous silver nitrate solution to react with a mixed solution of an aqueous iron(II) sulfate solution and an aqueous sodium citrate solution to form an agglomerate of fine silver particles;

a filtration step of filtering the resultant agglomerate of fine silver particles to obtain a cake of the agglomerate of fine silver particles;

a dispersion step of adding pure water to the cake to obtain a first fine silver particle colloidal dispersion of a water system in which dispersion the fine silver particles have been dispersed in the pure water; and a concentration and washing step of concentrating and washing the first fine silver particle colloidal dispersion of a water system.

The fine silver particle colloidal dispersion of a water system according to the present invention, obtained by this process, is characterized by being made up of water as a solvent, containing fine silver particles dispersed in a concentration of from 10 to 70% by weight, containing no polymeric dispersing agent, and having an electric conductivity of 200 μS/cm or less at the solvent part exclusive of the fine silver particles.

The process for producing a fine silver particle colloidal dispersion of a water-organic solvent system according to the present invention is also characterized by having:

a reaction step of allowing an aqueous silver nitrate solution to react with a mixed solution of an aqueous iron(II) sulfate solution and an aqueous sodium citrate solution to form an agglomerate of fine silver particles;

a filtration step of filtering the resultant agglomerate of fine silver particles to obtain a cake of the agglomerate of fine silver particles;

a dispersion step of adding pure water to the cake to obtain a first fine silver particle colloidal dispersion of a water system in which dispersion the fine silver particles have been dispersed in the pure water;

a concentration and washing step of concentrating and washing the first fine silver particle colloidal dispersion of a water system to obtain a second fine silver particle colloidal dispersion of a water system; and a dilution and viscosity modifying step of adding an organic solvent to the second fine silver particle colloidal dispersion of a water system.

The fine silver particle colloidal dispersion of a water-organic solvent system according to the present invention, obtained by this process, is characterized by being made up of water and an organic solvent as solvents, containing fine silver particles dispersed in a concentration of from 10 to 70% by weight, containing no polymeric dispersing agent, and having viscosity having been controlled within the range of from 1 to 1,000,000 mPa·s.

Then, the process for producing a fine silver particle colloidal dispersion of an organic solvent system according to the present invention is also characterized by having:

a reaction step of allowing an aqueous silver nitrate solution to react with a mixed solution of an aqueous iron(II) sulfate solution and an aqueous sodium citrate solution to form an agglomerate of fine silver particles;

a filtration step of filtering the resultant agglomerate of fine silver particles to obtain a cake of the agglomerate of fine silver particles;

a dispersion step of adding pure water to the cake to obtain a first fine silver particle colloidal dispersion of a water system in which dispersion the fine silver particles have been dispersed in the pure water;

a concentration and washing step of concentrating and washing the first fine silver particle colloidal dispersion of a water system to obtain a second fine silver particle colloidal dispersion of a water system; and a solvent displacement step of adding an organic solvent to the second fine silver particle colloidal dispersion of a water system and thereafter removing the water.

The fine silver particle colloidal dispersion of an organic solvent system according to the present invention, obtained by this process, is characterized by being made up of an organic solvent, containing fine silver particles dispersed therein in a concentration of from 10 to 70% by weight, containing no polymeric dispersing agent, and having viscosity having been controlled within the range of from 1 to 1,000,000 mPa·s.

The conductive silver film according to the present invention is also characterized by being formed using any of the above fine silver particle colloidal dispersions of a water system, a water-organic solvent system and an organic solvent system.

According to the present invention, fine silver particle colloidal dispersions which are very inexpensive, have superior dispersion stability, can obtain highly conductive films even when heat-treated at a low temperature after printing or coating, and moreover are adaptable to various printing or coating methods can be provided by a process which is simple and superior in productivity compared with conventional processes for producing fine silver particle colloidal dispersions.

BRIEF DESCRIPTION OF THE DRAWING

The sole Figure is a graph showing reflection profiles of conductive silver films according to Examples 4 and 5 of the present invention and a conductive silver film according to Comparative Example 2.

BEST MODES FOR PRACTICING THE INVENTION

The present invention is described below in greater detail.

In the outset, as processes for producing fine silver particles colloidal dispersions, some processes are already known in the art, among which the Carey-Lea process (see Am. J. Sci., 37, 47, 1889, and Am. J. Sci., 38, 1889) are commonly in wide use because of its advantages that fine silver particles can have small particle diameter and colloidal dispersions having a relatively high concentration can be obtained with ease.

According to this Carey-Lea process, an aqueous silver nitrate solution is mixed in a mixed solution of an aqueous iron(II) sulfate solution and an aqueous sodium citrate solution to allow them to react, the resultant agglomerate of fine silver particles are filtered and washed, and thereafter pure water is added to the resultant cake of the agglomerate of fine silver particles, whereby a fine silver particle colloidal dispersion can be obtained. The fine silver particle colloidal dispersion obtained by this Carey-Lea process has a fine silver particle concentration of from 0.1 to 10% by weight. If it has a concentration of more than 10% by weight, it tends to agglomerate.

Incidentally, when the aqueous silver nitrate solution is mixed in the mixed solution of an aqueous iron(II) sulfate solution and an aqueous sodium citrate solution, a method is employed in which one aqueous solution is put at a stretch into a container holding therein the other aqueous solution. However, such a mixing method not only brings about a poor productivity or production efficiency, but also tends to make the solutions non-uniformly mixed and react with each other, resulting in non-uniform particle diameter of the fine silver particles obtained. The method has such disadvantages. In order to eliminate these disadvantages, a method is desirable in which a static mixer (a mixing equipment having no mechanical movement) is used when the aqueous silver nitrate solution is mixed in the mixed solution of an aqueous iron(II) sulfate solution and an aqueous sodium citrate solution, and fine silver particles are continuously formed while keeping the state of mixing and reaction constant.

However, the fine silver particles used in the present invention may at least be those obtained by the above Carey-Lee process, which may be used without any problem, without regard to the form of mixing and reaction that is taken when the aqueous silver nitrate solution is mixed in the mixed solution of an aqueous iron(II) sulfate solution and an aqueous sodium citrate solution.

The reaction of forming fine silver particles in the above Carey-Lee process is represented by the following chemical reaction scheme (1).

$$Ag^+ + Fe^{2+} \rightarrow Ag + Fe^{3+} \qquad (1)$$

The fine silver particles formed upon the above reaction undergo the action of protection by citrate ions present together, and at the same time agglomerates rapidly on account of iron ions, sodium ions and so forth present in a high concentration. Hence, they come to form an agglomerate of fine silver particles protected by citrate ions. A series of such reaction takes place in 1 second to 2 seconds after the aqueous silver nitrate solution has been mixed in the mixed solution of an aqueous iron(II) sulfate solution and an aqueous sodium citrate solution, and hence the characteristics such as particle diameter of the fine silver particles to be obtained depend on how both the aqueous solutions are mixed.

Where a usual Carey-Lee process is used, in general, fine silver particles of about 5 to 15 nm in particle diameter are obtained through one-time processing. However, the above method in which they are mixed using the static mixer enables continuous production while controlling the particle diameter in such a way that the particle diameter is, e.g., 2 to 7 nm or 10 to 15 nm. More specifically, the liquid temperatures and flow rates (rates of inflow) of the aqueous solutions to be mixed and the structure of the static mixer may appropriately set, and this enables control of the particle diameter of fine silver particles. For example, the particle diameter shows a tendency that it increases with an increase in liquid temperature and it decreases with an increase in flow rate. As to the structure of the static mixer as well, the changing of its conventional-type torsion blade for a type in which torsion blades are alternately disposed brings a larger particle diameter.

To obtain the conductive silver film by printing by the use of the fine silver particle colloidal dispersion according to the present invention, the fine silver particles may preferably have an average particle diameter of from 1 to 30 nm. If they have an average particle diameter of less than 1 nm, it is difficult to produce such fine silver particles, and at the same time the fine silver particle colloidal dispersion may have a low dispersion stability. If on the other hand they have an average particle diameter of more than 30 nm, the sintering of fine silver particles one another may proceed with difficulty in the heat treatment carried out after the fine silver particle colloidal dispersion has been printed and then dried, to make it difficult to obtain a conductive film with a low-resistivity. Incidentally, the particle diameter herein referred to is the particle diameter of fine silver particles observed on a transmission electron microscope (TEM).

The agglomerate of fine silver particles which has been formed in the above reaction step is filtered in the next filtration step to obtain a cake of the agglomerate of fine silver particles. The cake of the agglomerate of fine silver particles may be filtered using a conventional method such as membrane filter filtration, centrifugation or filter pressing. Also, in the filtration step, the cake may be washed with pure water in an amount small enough not for the fine silver particles to be washed out.

Next, in the dispersion step, pure water is added to the cake of the agglomerate of fine silver particles. This greatly lowers the concentration of iron ions and sodium ions in the liquid, and hence there comes to be no agglomeration factor, so that the fine silver particles protected by citrate ions come redispersed in the liquid, thus a fine silver particle colloidal dispersion is obtained. Such a process for producing colloids is commonly called "wash-out process".

The fine silver particle colloidal dispersion thus obtained (fine silver particle concentration: 0.1 to 10% by weight) (i.e., a first fine silver particle colloidal dispersion of a water system) is concentrated and washed in a concentration and washing step to thereby make up a fine silver particle colloidal dispersion of a water system according to the present invention in which dispersion the fine silver particles have been dispersed in the water solvent in a high concentration (i.e., a second fine silver particle colloidal dispersion of a water system). The first fine silver particle colloidal dispersion of a water system may be concentration-treated by a conventional method such as reduced-pressure evaporation or ultrafiltration. Also, it may be washing-treated by a conventional method such as dialysis, electrodialysis, ion exchange or ultrafiltration. In particular, ultrafiltration is a preferable method because the concentration treatment and the washing treatment can simultaneously be carried out.

In the second fine silver particle colloidal dispersion of a water system, the washing treatment also lowers the concentration of electrolyte in the solvent, and hence this colloidal dispersion is improved in its fine silver particle dispersion stability. This is because, although colloids may commonly agglomerate in the presence of an electrolyte where the electrolyte is in a high concentration, their agglomeration is hindered where the electrolyte is in a low concentration. In order to enhance the fine silver particle dispersion stability to a practical level, the concentration of electrolyte may preferably be lowered until this colloidal dispersion comes to have an electric conductivity of 200 μS(siemens)/cm or less at the solvent part exclusive of the fine silver particles from the second fine silver particle colloidal dispersion of a water system (i.e., the fine silver particle colloidal dispersion of a water system according to the present invention).

Incidentally, the fine silver particles of the second fine silver particle colloidal dispersion of a water system (i.e., the fine silver particle colloidal dispersion of a water system according to the present invention) contains neither surface-active agent nor polymeric dispersing agent at all which is commonly used in fine silver particle colloidal dispersions obtained by the dry process mentioned previously or any commonly available wet process or the like. It is considered that the citrate ions coming from the Carey-Lee process and remaining slightly have made silver fine particles stable, which, however, are removed by the washing treatment described above, and hence their content is so small that any specific content is not measurable.

Now, in the fine silver particles of the second fine silver particle colloidal dispersion of a water system (i.e., the fine silver particle colloidal dispersion of a water system according to the present invention), the solvent is water and hence this may cause coating defects such as cissing in the step of film formation, depending on the types of substrates such as plastic.

Accordingly, an organic solvent is added to the second fine silver particle colloidal dispersion of a water system in a dilution and viscosity modifying step to make up a fine silver particle colloidal dispersion of a water-organic solvent system according to the present invention. The coating performance of this fine silver particle colloidal dispersion of a water-organic solvent system is vastly improved by the addition of the organic solvent. Here, the organic solvent to be used, the degree of washing of the second fine silver particle colloidal dispersion of a water system and the water content may be changed, whereby the viscosity of the fine silver particle colloidal dispersion of a water-organic solvent system to be obtained can also freely be controlled within the range of, e.g., from 1 to 1,000,000 mPa·s without addition of any particular viscosity modifier such as a binder resin. For example, there are tendencies that the viscosity increases as the degree of washing of the second fine silver particle colloidal dispersion of a water system is made higher to lessen its impurities, that, in regard to the addition of the organic solvent, alcohols such as ethanol increase the viscosity and ethylene glycols decrease the viscosity, and that, in regard to the water content, the viscosity decreases with an increase of the content. In regard to the mechanism of such a phenomenon, it is unclear, and it is presumed that the action of a certain kind of organic solvent makes the fine silver particles form a structure in which they have loosely combined with one another in the colloidal dispersion in a re-dispersible state. This is also suggestible from a phenomenon (thixotropy) that, in measuring the viscosity of the fine silver particle colloidal dispersion according to the present invention, for example, one having a high viscosity of about 10,000 mPa·s when the shear rate is low comes to have a low viscosity of about 2,000 mPa·s when the shear rate is high.

As another process, a solvent displacement step of adding an organic solvent to the second fine silver particle colloidal dispersion of a water system and thereafter removing the water is also taken to make up a fine silver particle colloidal dispersion of an organic solvent system (non-water system). The coating performance of this fine silver particle colloidal dispersion of an organic solvent system is also vastly improved in regard to the coating defects caused by the water content as stated above, because it is of a non-water system, which contains no water. Here, the degree of washing of the second fine silver particle colloidal dispersion of a water system to be used and the organic solvent may be changed, whereby the viscosity of the fine silver particle colloidal dispersion of an organic solvent system (non-water system) to be obtained can also freely be controlled within the range of, e.g., from 1 to 1,000,000 mPa·s without addition of any particular viscosity modifier such as a binder resin. For example, the viscosity increases as the degree of washing of the second fine silver particle colloidal dispersion of a water system is made higher to lessen its impurities, and, in regard to the addition of the organic solvent, alcohols such as ethanol increase the viscosity and ethylene glycols decrease the viscosity. In regard to the mechanism of such a phenomenon, it is unclear, and it is presumed that the action of a certain kind of organic solvent makes the fine silver particles form a structure in which they have loosely combined with one another in the colloidal dispersion in a re-dispersible state. This is also suggestible from the phenomenon (thixotropy) that, in measuring the viscosity of the fine silver particle colloidal dispersion according to the present invention, for example, one having a high viscosity of about 10,000 mPa·s when the shear rate is low comes to have a low viscosity of about 2,000 mPa·s when the shear rate is high.

Incidentally, the lowering of the concentration of electrolyte brings an improvement in the fine silver particle dispersion stability. This applies alike also in the fine silver particle colloidal dispersion of a water-organic solvent system in which dispersion the organic solvent is mixed, and also in the fine silver particle colloidal dispersion of an organic solvent system (non-water system) in which dispersion the fine silver particles are dispersed in the organic solvent. For example, a washing step of, e.g., adding an ion exchange resin may further be added either in the course of the dilution and viscosity modifying step of adding an organic solvent to the second fine silver particle colloidal dispersion of a water system to obtain the fine silver particle colloidal dispersion of a water-organic solvent system, or before or after the solvent displacement step of adding an organic solvent to the second fine silver particle colloidal dispersion of a water system and thereafter removing the water.

As the organic solvent, it is preferable to use an organic solvent containing at least dimethyl sulfoxide. This is because the dimethyl sulfoxide acts on the fine silver particles to have the effect of improving the stability of the fine silver particle colloidal dispersion. In the fine silver particle colloidal dispersion of a water-organic solvent system according to the present invention, the fact that the dimethyl sulfoxide has the effect of improving the stability of the fine silver particle colloidal dispersion has been found by the fact that a conductive silver film formed using the fine silver particle colloidal dispersion of a water-organic solvent system to which dispersion the dimethyl sulfoxide has been added shows a high visible-light reflectance. The figure shows the reflectance of a conductive silver film (with addition of the dimethyl sulfoxide) of Example 4 according to the present invention and that of a conductive silver film (with addition of no dimethyl sulfoxide) according to Comparative Example 2. The present inventors consider that the conductive silver film obtained using the fine silver particle colloidal dispersion of a water-organic solvent system to which dispersion the dimethyl sulfoxide has been added has accomplished the closest packing (close-packed structure) to come improved in the visible-light reflectance, because the fine silver particles have been stabilized and any agglomerates have been made not to easily come about in the step of drying the wet coating formed.

In the fine silver particle colloidal dispersion of an organic solvent system (non-water system) according to the present invention, too, the fact that the dimethyl sulfoxide has the effect of stabilizing the fine silver particles has also been found from the behavior of re-dispersion of a solid high-concentration silver cake (silver content: 80 to 90% by weight) composed of fine silver particles and a high-boiling organic solvent, obtained through a solvent displacement step of adding a high-boiling organic solvent in a small quantity to the second fine silver particle colloidal dispersion of a water system and thereafter removing the water. More specifically, where the dimethyl sulfoxide is used as the high-boiling organic solvent, the high-concentration silver cake is re-dispersed reversibly with respect to other organic solvent(s), so that the fine silver particle colloidal dispersion of an organic solvent system (non-water system) is obtained, whereas, where a high-boiling organic solvent other than dimethyl sulfoxide, as exemplified by γ-butyrolactone, is used to carry out the like operation, such a high-concentration silver cake is not re-dispersed reversibly with respect to other organic solvent(s). This is considered due to the fact that the dimethyl sulfoxide comes adsorbed on the surfaces of the fine silver particles to have protective action, and hence it prevents the fine particles from mutually irreversibly agglomerating.

Here, the dimethyl sulfoxide may be mixed in an amount of from 0.5 to 300 parts by weight, and preferably from 2 to 50 parts by weight, based on 100 parts by weight of the fine silver particles. If it is mixed in an amount of less than 0.5 part by weight, the effect to be brought by the addition of the dimethyl sulfoxide is not seen. If it is in an amount of more than 300 parts by weight, any further improvement of the stability of fine silver particles is not seen, only resulting in a long drying time after printing or coating.

The organic solvent(s) other than the dimethyl sulfoxide may appropriately be selected taking account of the compatibility with the second fine silver particle colloidal dispersion of a water system, the solubility against substrates, and the film forming conditions. For example, it may include, but is not limited to, alcohol type solvents such as methanol (MA), ethanol (EA), 1-propanol (NPA), isopropanol (IPA), butanol, pentanol, benzyl alcohol and diacetone alcohol (DAA); ketone type solvents such as acetone, methyl ethyl ketone (MEK), methyl propyl ketone, methyl isobutyl ketone (MIBK), cyclohexanone and isophorone; glycol derivatives such as ethylene glycol monomethyl ether (MCS), ethylene glycol monoethyl ether (ECS), ethylene glycol isopropyl ether (IPC), propylene glycol methyl ether (PGM), propylene glycol ethyl ether (PE), propylene glycol methyl ether acetate (PGM-AC), propylene glycol ethyl ether acetate (PE-AC), diethylene glycol monomethyl ether, diethylene glycol monoethyl ether, diethylene glycol monobutyl ether, diethylene glycol monomethyl ether acetate, diethylene glycol monoethyl ether acetate, diethylene glycol monobutyl ether acetate, diethylene glycol dimethyl ether, diethylene glycol diethyl ether, diethylene glycol dibutyl ether, dipropylene glycol monomethyl ether, dipropylene glycol monoethyl ether and dipropylene glycol monobutyl ether; and formamide (FA), N-methylformamide, dimethylformamide (DMF), dimethylacetamide, N-methyl-2-pyrrolidone (NMP), ethylene glycol, diethylene glycol, toluene, xylene, tetrahydrofuran (THF), chloroform, mesitylene and dodecylbenzene.

In particular, in ink-jet printing making use of the fine silver particle colloidal dispersion of an organic solvent system (non-water system), taking account of printing performance, nozzle clogging and so forth, it is preferable for the solvent(s) to have a viscosity of from several to tens of mPa·s, and preferably from 5 to 20 mPa·s, and for a chief solvent to have a boiling point (concerned with evaporation rate) of approximately from 130 to 280° C., and preferably from 150 to 250° C. Also, in order to cause no cissing and also secure coating performance, it is necessary for the solvent to have a relatively low surface tension. From the viewpoint of these, stated specifically, it is preferable to use, as the chief solvent, an ethylene glycol derivative such as ethylene glycol monobutyl ether (boiling point: 170° C.; viscosity: 3.15 mPa·s; surface tension: 27.4 dyn/cm), diethylene glycol monomethyl ether (boiling point: 194° C.; viscosity: 3.48 mPa·s; surface tension: 34.8 dyn/cm), diethylene glycol monoethyl ether (boiling point: 202° C.; viscosity: 3.71 mPa·s; surface tension: 31.8 dyn/cm) or diethylene glycol monobutyl ether (boiling point: 230° C.; viscosity: 6.49 mPa·s; surface tension: 33.6 dyn/cm); or a diethylene glycol derivative.

The fine silver particles in the fine silver particle colloidal dispersion of a water system, obtained through the concentration and washing step described above, the fine silver particles in the fine silver particle colloidal dispersion of a waterorganic solvent system, obtained through the concentration and washing step and the dilution and viscosity modifying step, and the fine silver particles in the fine silver particle colloidal dispersion of an organic solvent system (non-water system), obtained through the concentration and washing step and solvent displacement step described above, may all preferably be in a concentration of from 10 to 70% by weight, and more preferably in the range of from 15 to 60% by weight. If the fine silver particles are in a concentration of less than 10% by weight, it is difficult to obtain a film with sufficient thickness in one-time printing. Being particularly in the concentration of 15% by weight, superior conductive silver films having a low resistivity can stably be formed by printing. On the other hand, if the fine silver particles are in a concentration of more than 70% by weight, the dispersion of fine silver particles in the fine silver particle colloidal dispersion may come unstable, and also it is difficult to keep fluidity as stated above, so that the particles may come into a solid cake. However, in the case of the fine silver particle colloidal dispersion of an organic solvent system (non-water system), such a solid cake of fine silver particles may be re-dispersed in an organic solvent to make up the fine silver particle colloidal dispersion.

According to the process for producing a fine silver particle colloidal dispersion according to the present invention, the fine silver particle colloidal dispersion can simply be produced in which the fine silver particles having an average particle diameter of from 1 to 30 nm suitable to form conductive layers or the like are dispersed in the water solvent, in the mixed solvent of water and an organic solvent or in the organic solvent, and which contains such fine silver particles in a concentration high enough to be applicable to printing, contains no polymeric dispersing agent and less other impurities, and has a superior dispersion stability.

Then, the fine silver particle colloidal dispersion obtained by this process not only has a superior dispersion stability, but also enables free control of its viscosity, and hence is adaptable to various printing or coating methods as exemplified by screen printing, gravure coating, ink-jet printing, wire bar coating, doctor blade coating, roll coating and spin coating, any of which may be used. It is preferably usable to form antimicrobial coatings and conductive layers, and besides can materialize conductive films having a high conductivity even when heat-treated at a low temperature after printing or coating.

The present invention is specifically described below by giving Examples. The present invention is by no means limited to these Examples. In the following, "%" refers to "% by weight", and "part(s)" refers to "part(s) by weight".

EXAMPLE 1

A mixed solution of 3,900 g of an aqueous 23.1% iron sulfate ($FeSO_4.7H_2O$) solution and 4,800 g of an aqueous 37.5% sodium citrate [$C_3H_4(OH)(COONa)_3.2H_2O$] solution and 3,300 g of an aqueous 9.1% silver nitrate ($AgNO_3$) solution were mixed for 10 minutes at flow rates of 870 g/minute and 330 g/minute, respectively, by means of a static mixer (manufactured by Shin-yu Giken; one having the structure disclosed in Japanese Patent Application Laid-open No. H11-82919) to obtain a reaction fluid containing an agglomerate of fine silver particles. Incidentally, at the time of the above mixing, the mixed solution of an aqueous iron sulfate solution and an aqueous sodium citrate solution and the aqueous silver nitrate solution were set at liquid temperatures of 10° C. and 5° C., respectively.

From the above reaction fluid, the agglomerate of fine silver particles was filtered out by means of an centrifugal separator to obtain a cake of the agglomerate of fine silver particles. Thereafter, pure water was added to this cake to carry out washing-out to obtain 30,700 g of a first fine silver particle colloidal dispersion of a water system (Ag: 0.5%).

The first fine silver particle colloidal dispersion of a water system (Ag: 0.5%), thus obtained, was concentrated and washed by ultrafiltration to obtain a fine silver particle colloidal dispersion according to Example 1 (Ag: 40%; the balance: water), constituted as a second fine silver particle colloidal dispersion of a water system. The solvent (water) in this fine silver particle colloidal dispersion had an electric conductivity of 130 μS/cm as the value found by measuring the filtrate of the ultrafiltration. Also, the fine silver particles were from 2 to 8 nm in particle diameter.

Next, a glass substrate (soda-lime glass of 3 mm in thickness) kept at room temperature was coated thereon with the fine silver particle colloidal dispersion according to Example 1 by means of an applicator (gap: 125 μm), followed by drying and thereafter heat treatment at 160° C. for 20 minutes in the atmosphere to obtain a conductive silver film according to Example 1. This conductive silver film was 0.3 μm in layer thickness and 0.7 Ω/square in surface resistivity.

Incidentally, the glass substrate was, before its use, polished with a cerium oxide type abrasive, thereafter washed with pure water, followed by drying, and then used. The surface resistivity of the conductive silver film was measured with a surface resistivity meter LORESTA AP (MCP-T400), manufactured by Mitstubishi Chemical Corporation. Also, the particle diameter of the fine silver particles was measured with a transmission electron microscope manufactured by JEOL Ltd.

EXAMPLE 2

The fine silver particle colloidal dispersion obtained in Example 1 was diluted with pure water to have an Ag concentration of 20%. A glass substrate (soda-lime glass of 3 mm in thickness) kept at room temperature was coated thereon with this fine silver particle colloidal dispersion (Ag: 20%) according to Example 2 by means of an applicator (gap: 125 µm), followed by drying and thereafter heat treatment at 115° C. for 60 minutes in the atmosphere. The conductive silver film according to Example 2, thus obtained, was 0.16 µm in layer thickness and 2.2 Ω/square in surface resistivity.

EXAMPLE 3

A glass substrate (soda-lime glass of 3 mm in thickness) kept at room temperature was coated thereon with the same fine silver particle colloidal dispersion (Ag: 20%) as that of Example 2 by means of an applicator (gap: 125 µm), followed by drying and thereafter heat treatment at 95° C. for 120 minutes in the atmosphere. The conductive silver film according to Example 3, thus obtained, was 0.16 µm in layer thickness and 3.6Ω/square in surface resistivity.

From the results of Examples given above, the following is confirmed.

First, the fine silver particle colloidal dispersions according to these Examples are obtained by very simple methods, i.e., wet-process reaction and ultrafiltration, and hence can be produced at a very low cost. Also, because of the use of these fine silver particle colloidal dispersions, low-resistivity films can be obtained even when the films formed by coating and then dried are heat-treated at low temperatures of from 95 to 160° C. This shows that the dispersion of fine silver particles in the fine silver particle colloidal dispersion is so highly stable that the fine silver particles can stand finely and densely packed in the film, and also shows that the sintering of fine silver particles one another has proceeded even at a low temperature because no polymeric dispersing agent is present and any other impurities are less present.

COMPARATIVE EXAMPLE 1

Using the evaporation-in-gas method, silver was evaporated and condensed in a gas under reduced pressure to collect the silver in a solution containing a polymeric dispersing agent, to produce a fine silver particle colloidal dispersion paste (Ag: 20%). A conductive silver film according to Comparative Example 1 was formed in the same manner as in Example 1 except that this fine silver particle colloidal dispersion paste was used. The conductive silver film obtained was 1 MΩ/square or more in surface resistivity.

EXAMPLE 4

A mixed solution of 3,900 g of an aqueous 23.1% iron sulfate ($FeSO_4 \cdot 7H_2O$) solution and 4,800 g of an aqueous 37.5% sodium citrate [$C_3H_4(OH)(COONa)_3 \cdot 2H_2O$] solution and 3,300 g of an aqueous 9.1% silver nitrate ($AgNO_3$) solution were mixed for 10 minutes at flow rates of 870 g/minute and 330 g/minute, respectively, by means of the static mixer to obtain a reaction fluid containing an agglomerate of fine silver particles. Incidentally, at the time of the above mixing, the mixed solution of an aqueous iron sulfate solution and an aqueous sodium citrate solution and the aqueous silver nitrate solution were set at liquid temperatures of 10° C. and 5° C., respectively.

From the above reaction fluid, the agglomerate of fine silver particles was filtered out by means of an centrifugal separator to obtain a cake of the agglomerate of fine silver particles. Thereafter, pure water was added to this cake to carry out washing-out to obtain 30,700 g of a first fine silver particle colloidal dispersion of a water system (Ag: 0.5%).

The first fine silver particle colloidal dispersion of a water system (Ag: 0.5%), thus obtained, was concentrated and washed by ultrafiltration to obtain a second fine silver particle colloidal dispersion of a water system (Ag: 40%; the balance: water). The solvent (water) in this second fine silver particle colloidal dispersion of a water system had an electric conductivity of 130 µS/cm as the value found by measuring the filtrate of the ultrafiltration. Also, the fine silver particles were from 2 to 8 nm in particle diameter.

Next, to the second fine silver particle colloidal dispersion of a water system, dimethyl sulfoxide (DMSO), 1-butanol (NBA), diacetone alcohol (DAA) and ethanol (EA) were added to obtain a fine silver particle colloidal dispersion according to Example 4 (Ag: 10%; DMSO: 2.5%; $H_2O$: 15%; EA: 48.5%; NBA: 8%; DAA: 16%). Its viscosity was 4 mPa·s.

Next, a PET film (thickness: 100 µm; a primer-treated product) was coated thereon with the fine silver particle colloidal dispersion according to Example 4 by means of a wire bar of 0.4 mm in wire diameter, followed by heat treatment at 70° C. for 5 minutes and subsequently at 150° C. for 10 minutes both in the atmosphere to obtain a conductive silver film according to Example 4. This conductive silver film was 0.16 µm in layer thickness and 0.7Ω/square in surface resistivity. Also, its visible-light reflectance was 64%. A reflection profile of the conductive silver film according to Example 4 is shown in FIG. 1.

Incidentally, the viscosity of the fine silver particle colloidal dispersion according to Example 4 was measured with a vibratory viscometer VM-100-L, manufactured by Yamaichi Electronics Co., Ltd. (viscosity: 10 mPa·s or less) and a Broockfield type viscometer (viscosity: 10 mPa·s or more). In the measurement with the Broockfield type viscometer, the viscosity was measured using No. 4 rotor at 12 rpm. The surface resistivity of the conductive silver film was measured with a surface resistivity meter LORESTA AP (MCP-T400), manufactured by Mitstubishi Chemical Corporation. Also, the particle diameter of the fine silver particles was measured with a transmission electron microscope manufactured by JEOL Ltd. The visible-light reflectance and the reflection profile were measured with a spectrophotometer (U-4000) manufactured by Hitachi Ltd.

EXAMPLE 5

To the second fine silver particle colloidal dispersion of a water system obtained in Example 4, dimethyl sulfoxide (DMSO), 1-butanol (NBA), diacetone alcohol (DAA) and ethanol (EA) were added to obtain a fine silver particle colloidal dispersion according to Example 5 (Ag: 10%; DMSO: 1.0%; $H_2O$: 15%; EA: 50.0%; NBA: 8%; DAA: 16%). Its viscosity was 4 mPa·s.

A conductive silver film according to Example 5 was obtained in the same manner as in Example 4 except that this fine silver particle colloidal dispersion was used. This conductive silver film was 0.16 μm in layer thickness and 0.8Ω/square in surface resistivity. Also, its visible-light reflectance was 61%. A reflection profile of the conductive silver film according to Example 5 is also shown in FIG. 1.

EXAMPLE 6

The first fine silver particle colloidal dispersion of a water system (Ag: 0.5%) which was obtained in Example 4 was concentrated and washed by ultrafiltration to obtain a second fine silver particle colloidal dispersion of a water system (Ag: 50%; the balance: water). The solvent (water) in this second fine silver particle colloidal dispersion of a water system had an electric conductivity of 110 μS/cm as the value found by measuring the filtrate of the ultrafiltration. Also, the fine silver particles were from 2 to 8 nm in particle diameter.

To the second fine silver particle colloidal dispersion of a water system, dimethyl sulfoxide (DMSO), 1-butanol (NBA), diacetone alcohol (DAA) and ethanol (EA) were added to obtain a fine silver particle colloidal dispersion according to Example 6 (Ag: 20%; DMSO: 5%; $H_2O$: 20%; EA: 40.0%; NBA: 5%; DAA: 10%). Its viscosity was 5,000 mPa·s.

Next, a PET film (thickness: 100 μm; a primer-treated product) was coated thereon with the fine silver particle colloidal dispersion according to Example 6 by means of a wire bar of 0.15 mm in wire diameter, followed by heat treatment at 70° C. for 5 minutes and subsequently at 150° C. for 10 minutes both in the atmosphere to obtain a conductive silver film according to Example 6. This conductive silver film was 0.16 μm in layer thickness and 0.8Ω/square in surface resistivity. Also, its visible-light reflectance was 63%.

EXAMPLE 7

To the second fine silver particle colloidal dispersion of a water system obtained in Example 6, water, dimethyl sulfoxide (DMSO), 1-butanol (NBA), diacetone alcohol (DAA) and ethanol (EA) were added to obtain a fine silver particle colloidal dispersion according to Example 7 (Ag: 20%; DMSO: 5%; $H_2O$: 25%; EA: 35.0%; NBA: 5%; DAA: 10%). Its viscosity was 500 mPa·s.

Next, a PET film (thickness: 100 μm; a primer-treated product) was coated thereon with the fine silver particle colloidal dispersion according to Example 7 by means of a wire bar of 0.15 mm in wire diameter, followed by heat treatment at 70° C. for 5 minutes and subsequently at 150° C. for 10 minutes both in the atmosphere to obtain a conductive silver film according to Example 7. This conductive silver film was 0.14 μm in layer thickness and 0.9Ω/square in surface resistivity. Also, its visible-light reflectance was 63%.

COMPARATIVE EXAMPLE 2

To the second fine silver particle colloidal dispersion of a water system obtained in Example 4, dimethyl sulfoxide (DMSO) was not added and 1-butanol (NBA), diacetone alcohol (DAA) and ethanol (EA) were added to obtain a fine silver particle colloidal dispersion according to Comparative Example 2 (Ag: 10%; $H_2O$: 15%; EA: 51.0%; NBA: 8%; DAA: 16%). Its viscosity was 4 mPa·s.

A conductive silver film according to Comparative Example 2 was obtained in the same manner as in Example 4 except that this fine silver particle colloidal dispersion was used. This conductive silver film was 0.17 μm in layer thickness and 1.0Ω/square in surface resistivity. Also, its visible-light reflectance was 26%. A reflection profile of the conductive silver film according to Comparative Example 2 is also shown in FIG. 1.

From the results of these Examples 4 to 7, the following is confirmed. First, the fine silver particle colloidal dispersions according to these Examples are obtained by very simple methods, i.e., wet-process reaction and ultrafiltration, and hence can be produced at a very low cost. Also, because of the use of these fine silver particle colloidal dispersions, they are applicable to various types of substrates such as glass and plastic, and also, since the viscosity of the fine silver particle colloidal dispersion is freely controllable, are adaptable to various types of printing or coating methods, and further low-resistivity films can be obtained even when heat-treated at low temperatures after printing or coating. This shows that the dispersion of fine silver particles in the fine silver particle colloidal dispersion is so highly stable that the fine silver particles can stand finely and densely packed in the film, and also shows that the sintering of fine silver particles one another has proceeded even at a low temperature because no polymeric dispersing agent is present and any other impurities are less present.

EXAMPLE 8

A mixed solution of 3,900 g of an aqueous 23.1% iron sulfate ($FeSO_4·7H_2O$) solution and 4,800 g of an aqueous 37.5% sodium citrate [$C_3H_4(OH)(COONa)_3·2H_2O$] solution and 3,300 g of an aqueous 9.1% silver nitrate ($AgNO_3$) solution were mixed for 10 minutes at flow rates of 870 g/minute and 330 g/minute, respectively, by means of the static mixer to obtain a reaction fluid containing an agglomerate of fine silver particles. Incidentally, at the time of the above mixing, the mixed solution of an aqueous iron sulfate solution and an aqueous sodium citrate solution and the aqueous silver nitrate solution were set at liquid temperatures of 10° C. and 5° C., respectively.

From the above reaction fluid, the agglomerate of fine silver particles was filtered out by means of an centrifugal separator to obtain a cake of the agglomerate of fine silver particles. Thereafter, pure water was added to this cake to carry out washing-out to obtain 30,700 g of a first fine silver particle colloidal dispersion of a water system (Ag: 0.5%).

The first fine silver particle colloidal dispersion of a water system (Ag: 0.5%), thus obtained, was concentrated and washed by ultrafiltration to obtain a second fine silver particle colloidal dispersion of a water system (Ag: 60%; the balance: water). The solvent (water) in this second fine silver particle colloidal dispersion of a water system had an electric conductivity of 150 μS/cm as the value found by measuring the filtrate of the ultrafiltration. Also, the fine silver particles were from 2 to 8 nm in particle diameter.

To the second fine silver particle colloidal dispersion of a water system, dimethyl sulfoxide (DMSO) was added, followed by heating under reduced pressure to remove the water completely to obtain a high-concentration silver cake (Ag: 80%; DMSO: 20%).

To the high-concentration silver cake, ethylene glycol monobutyl ether was added to obtain a fine silver particle colloidal dispersion according to Example 8 (Ag: 20%; DMSO: 5%; ethylene glycol monobutyl ether: 75%). Its viscosity was 10 mPa·s.

Next, a PET film (thickness: 100 μm; a primer-treated product) was coated thereon with the fine silver particle colloidal dispersion according to Example 8 by means of a wire bar of 0.15 mm in wire diameter, followed by heat treatment at 70° C. for 5 minutes and subsequently at 120° C. for 30 minutes both in the atmosphere to obtain a conductive silver film according to Example 8. This conductive silver film was 0.18 µm in layer thickness and 1.0Ω/square in surface resistivity.

Incidentally, the viscosity of this fine silver particle colloidal dispersion was measured with a vibratory viscometer VM-100-L, manufactured by Yamaichi Electronics Co., Ltd. The surface resistivity of the conductive silver film was measured with a surface resistivity meter LORESTA AP (MCP-T400), manufactured by Mitstubishi Chemical Corporation. Also, the particle diameter of the fine silver particles was measured with a transmission electron microscope manufactured by JEOL Ltd.

EXAMPLE 9

Using the fine silver particle colloidal dispersion of Example 8, ink-jet printing was performed to form lines of 100 µm in width. After the ink-jet printing, heat treatment was carried out in the same manner as in Example 8 to obtain a conductive silver film according to Example 9. This conductive silver film was 0.2 µm in layer thickness, and was 1.0Ω/square in surface resistivity as calculated from its line shape (length and width) and its resistivity.

From the results of these Examples 8 and 9, the following is confirmed. First, the fine silver particle colloidal dispersions according to these Examples are obtained by very simple methods, i.e., wet-process reaction and ultrafiltration, and hence can be produced at a very low cost. Also, because of the use of these fine silver particle colloidal dispersions, they are applicable to various types of substrates such as glass and plastic, and also, since the viscosity of the fine silver particle colloidal dispersion is freely controllable, are adaptable to various types of printing or coating methods, and further low-resistivity films can be obtained even when heat-treated at low temperatures after printing or coating. This shows that the dispersion of fine silver particles in the fine silver particle colloidal dispersion is so highly stable that the fine silver particles can stand finely and densely packed in the film, and also shows that the sintering of fine silver particles one another has proceeded even at a low temperature because no polymeric dispersing agent is present and any other impurities are less present.

POSSIBILITY OF INDUSTRIAL APPLICATION

As described above, the fine silver particle colloidal dispersions of a water system, a water-organic solvent system and an organic solvent system which are obtained by the production process of the present invention have a superior dispersion stability, can form highly conductive films even when heat-treated at a low temperature after printing or coating, and moreover are adaptable to various printing or coating methods. Hence, these colloidal dispersions are suitable to form conductive silver layers and antimicrobial coatings on substrates by screen printing, ink-jet printing or the like.

The invention claimed is:

1. A process for producing a fine silver particle colloidal dispersion of a water-organic solvent system which comprises:
    a reaction step of allowing an aqueous silver nitrate solution to react with a mixed solution of an aqueous iron(II) sulfate solution and an aqueous sodium citrate solution to form an agglomerate of fine silver particles;
    a filtration step of filtering the resultant agglomerate of fine silver particles to obtain a cake of the agglomerate of fine silver particles;
    a dispersion step of adding pure water to the cake to obtain a first fine silver particle colloidal dispersion of a water system in which dispersion the fine silver particles have been dispersed in the pure water;
    a concentration and washing step of concentrating and washing the first fine silver particle colloidal dispersion of a water system to obtain a second fine silver particle colloidal dispersion of a water system; and
    a dilution and viscosity modifying step of adding an organic solvent to the second fine silver particle colloidal dispersion of a water system; wherein
    after the concentration and washing step, the second fine silver particle colloidal dispersion of a water system, when subjected to ultrafiltration, has an ultrafiltrate that has an electric conductivity of 200 µS/cm or less;
    in the dilution and viscosity modifying step, said organic solvent comprises dimethyl sulfoxide, and the fine silver particles in said fine silver particle colloidal dispersion of a water-organic solvent system are in a concentration of from 10% by weight to 70% by weight; and
    said fine silver particle colloidal dispersion of a water-organic solvent system does not contain any polymeric dispersing agent.

2. The process for producing a fine silver particle colloidal dispersion according to claim 1, wherein the dimethyl sulfoxide is mixed in an amount of from 2 parts by weight to 50 parts by weight based on 100 parts by weight of the fine silver particles.

3. The process for producing a fine silver particle colloidal dispersion according to claim 1, wherein the fine silver particles in said fine silver particle colloidal dispersion of a water-organic system have an average particle diameter of from 1 nm to 30 nm.

* * * * *